(12) United States Patent
Hjelmström et al.

(10) Patent No.: US 10,091,437 B2
(45) Date of Patent: *Oct. 2, 2018

(54) METHOD FOR DETERMINATION OF FOCAL LENGTH FOR A ZOOM LENS

(71) Applicant: Axis AB, Lund (SE)

(72) Inventors: Jonas Hjelmström, Lund (SE); Andreas Nilsson, Lund (SE)

(73) Assignee: Axis AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,311

(22) Filed: Dec. 22, 2017

(65) Prior Publication Data

US 2018/0124329 A1 May 3, 2018

Related U.S. Application Data

(63) Continuation of application No. 15/088,787, filed on Apr. 1, 2016, now Pat. No. 9,888,187.

(30) Foreign Application Priority Data

Apr. 2, 2015 (EP) .................................... 15162434

(51) Int. Cl.
*H04N 5/262* (2006.01)
*G06T 5/00* (2006.01)
(Continued)

(52) U.S. Cl.
CPC ......... *H04N 5/2628* (2013.01); *G06T 3/0093* (2013.01); *G06T 5/006* (2013.01);
(Continued)

(58) Field of Classification Search
CPC .... H04N 5/2628; H04N 5/217; H04N 5/3572; H04N 17/002; G06T 7/13; G06T 7/80; G06T 3/0093; G06T 5/006
See application file for complete search history.

(56) References Cited

U.S. PATENT DOCUMENTS 7,496,241 B1 2/2009 Reneker et al.
9,888,187 B2 * 2/2018 Hjelmstrom ......... H04N 5/2628
(Continued)

FOREIGN PATENT DOCUMENTS

CN 10213614 B 7/2012
EP 0 895 189 A1 2/1999
(Continued)

OTHER PUBLICATIONS

"Line-Based Correction of Redial Lens Distortion", Prescott et al.; CVGIP Graphical Models and Image Processing, Academic Press, Duluth, MA (US), vol. 59, No. 1, Jan. 31, 1997, pp. 39-47; XP004418948, ISSN: 1077-3169.
(Continued)

*Primary Examiner* — Twyler L Haskins
*Assistant Examiner* — Angel L Garces-Rivera
(74) *Attorney, Agent, or Firm* — Volpe and Koenig, P.C.

(57) ABSTRACT

A method and apparatus for determining a focal-length setting of a lens mounted to a camera. In a method for determining a focal-length of a lens mounted to a camera, a distorted image of a scene is captured. A distortion-correction function is applied on the distorted image or on a portion of the distorted image. A most representative distortion-correction function is identified and a current focal-length setting for the lens is identified by correlating the identification to a data compilation.

9 Claims, 3 Drawing Sheets

(51) Int. Cl.
*H04N 5/357* (2011.01)
*H04N 17/00* (2006.01)
*G06T 3/00* (2006.01)
*H04N 5/217* (2011.01)
*G06T 7/80* (2017.01)
*G06T 7/13* (2017.01)

(52) U.S. Cl.
CPC .......... *G06T 7/13* (2017.01); *G06T 7/80* (2017.01); *H04N 5/217* (2013.01); *H04N 5/3572* (2013.01); *H04N 17/002* (2013.01)

(56) References Cited

U.S. PATENT DOCUMENTS

| | | |
|---|---|---|
| 2003/0133019 A1 | 7/2003 | Higurashi et al. |
| 2007/0024712 A1 | 2/2007 | Morita et al. |
| 2007/0098296 A1 | 5/2007 | Souchard |
| 2008/0239107 A1 | 10/2008 | Cho |
| 2010/0033567 A1 | 2/2010 | Gupta et al. |

FOREIGN PATENT DOCUMENTS

| | | |
|---|---|---|
| EP | 1 484 576 A2 | 12/2004 |
| EP | 1 816 869 A1 | 8/2007 |
| WO | 2014/083386 A2 | 6/2014 |

OTHER PUBLICATIONS

"An Algebraic Approach to Lens Distortion by Line Rectification"; Alvarez, et al.; Jul. 17, 2008; pp. 1-23.

"Straight Lines Have to Be Straight: Automatic Calibration and Removal of Distortion from Scenes of Structured Environments", Devernay et al.; Machine Vision and Applications, Springer Verlag (Germany), 2001, 13 (1), pp. 14-24; submitted on Mar. 26, 2008.

* cited by examiner

METHOD FOR DETERMINATION OF FOCAL LENGTH FOR A ZOOM LENS

CROSS REFERENCE TO RELATED APPLICATION

This application is a continuation of U.S. patent application Ser. No. 15/088,787, filed Apr. 1, 2016, which is incorporated by reference as if fully set forth.

FIELD OF INVENTION

The present teachings relate to a method for determining focal length.

BACKGROUND

Every lens system introduces various types of optical artifacts, and the present disclosure relates to geometric distortions or rather the determination and utilization thereof.

A common type of geometric distortion in an imaging system including a zoom lens is barrel distortion. Barrel distortion manifests itself in that the magnification decreases with distance from the optical axis, barrel distortion is categorized as a radial distortion, as is pincushion distortion and moustache distortion. The effect of barrel distortion may be that a rectangular object with four straight edges as imaged will obtain a barrel-like shape where the edges are convex, hence the name.

Depending on the specification for the lens and the zoom settings the geometric distortion may be more or less pronounced. The aperture of the camera affects the quality of the image and the optimum aperture is depending on the focal length. In order to have a zoom lens operate at the sweet spot where the imaging system is optimized on image quality the aperture has to be adjusted according to the present focal length, and consequently continuously updated information on the present focal setting is of value. Some lenses uses feedback from zoom motors in order to keep track of the present focal length. However, there are also zoom lenses that do not have this feature, e.g. lenses where the zoom settings are made manually and other zoom lenses where there is no feedback function. The category "zoom lenses" is typically divided into varifocal lenses and parfocal lenses and for the purposes of the present disclosure the word "zoom lens" will mainly be used and zoom setting and focus setting or focal length setting will be used in parallel.

SUMMARY

A method for determining focal-length setting of a lens mounted to a camera, comprises: capturing a distorted image of a scene and identifying edges in the image by means of an edge-detection algorithm. For at least a fraction of the identified edges functions describing them are identified. The identified functions, or a selection and/or combination of the identified functions, are compared with a data relating to the characteristics of the lens. The data may comprise transformation data correlating a distortion-correction function with a number of focal-length settings for the lens is used to identify a focal-length setting which is related to the identified functions, or the selection and/or the combination of the identified functions.

By using the method a value for the present focal-length setting may be extracted from image data contained in a distorted image, and used for any desired purpose. It may be important to note that in most cases one and the same distortion-correction function will describe the distortion for the entire image (for each focal-length setting), and a greater number of edges evaluated may increase the precision and accuracy in the identification process.

In one or more embodiments the step of identifying functions is performed on edges identified in the distorted image while in a distorted format. Typical appearances for a barrel-distortion is that lines or edges that should have been straight get a curved appearance in the distorted image, and the curved edges are well-suited for curve fitting. The fact that the barrel distortion (in effect the curvature of the lines) will increase with the distance from the optical axis may result in that the lines further away from the optical axis may be used to identify functions with better accuracy and precision.

In one or several embodiments the step of identifying functions is based on fitting of the distortion-correction functions available in the transformation data, i.e. selected among the distortion-correction functions describing the characteristics of the lens. The identification may be performed in several different ways. In most embodiments there is a desire to conform the functions evaluated in a fit to at least the format of the functions to be compared with at a later stage, in order for the result of the fit to be usable. In the present embodiment however the distortion correction functions used are limited to the ones present in the data relating to the characteristics of the lens. The process of finding the best fit the identification process may follow any suitable optimization algorithm.

In one or several embodiments a distortion correction is performed before or as a step in identifying the best fit. After a distortion-correction function is applied on the distorted image an amount of straight edges is identified. Following that a new distortion-correction function is applied, and the amount of straight edges is identified. By iterating the process for various distortion correction functions present in the data the most fitting distortion correction function may be identified. Again, any suitable optimization algorithm may be used for the process. It may or may not be preferable to use the whole image in the evaluation. An alternative may be to only use portions of the image, e.g. a portion identified as a foreground, or portions comprising objects having edges, or merely the edges or a fraction of the edges identified in the edge detection.

The distortion-correction function may be a polynomial of degree 5 or less, such as 4, 3, 2, or 1. A polynomial of degree 3 may be preferred since it may be complex enough to describe the distortion yet non-complex enough to enable a swift identification process.

The data relating to the characteristics of the lens may comprise a mapping of polynomials or other functions and correlated focal-length settings for the lens.

DETAILED DESCRIPTION

Every lens introduces geometric distortions in the scene captured. In a zoom lens the geometric distortion varies for different focal lengths. Barrel distortion is one form of geometric distortion introduced in wide angle lenses. The amount of geometrical distortion of a fixed focal length lens depends on the distance from the centre of the lens, i.e. radius. In a zoom lens, as for any other lens or lens system, the geometrical distortion is a function of the distance from the centre of the lens, for each focal length setting. A general rule of thumb is that the shorter the focal length setting of the zoom lens the greater the distortion. The geometrical distortion may thus be described as a function of the radius, r, and in some sense the focal length, f. For each focal length the geometric distortion will vary with the radius according to a specific function.

One idea of the present disclosure is to utilize this dependence in a method for finding the present focal length setting of a lens. This may be performed by means of analyses based on the geometrical distortion, which will be described in some more detail in the following.

Figure 1:
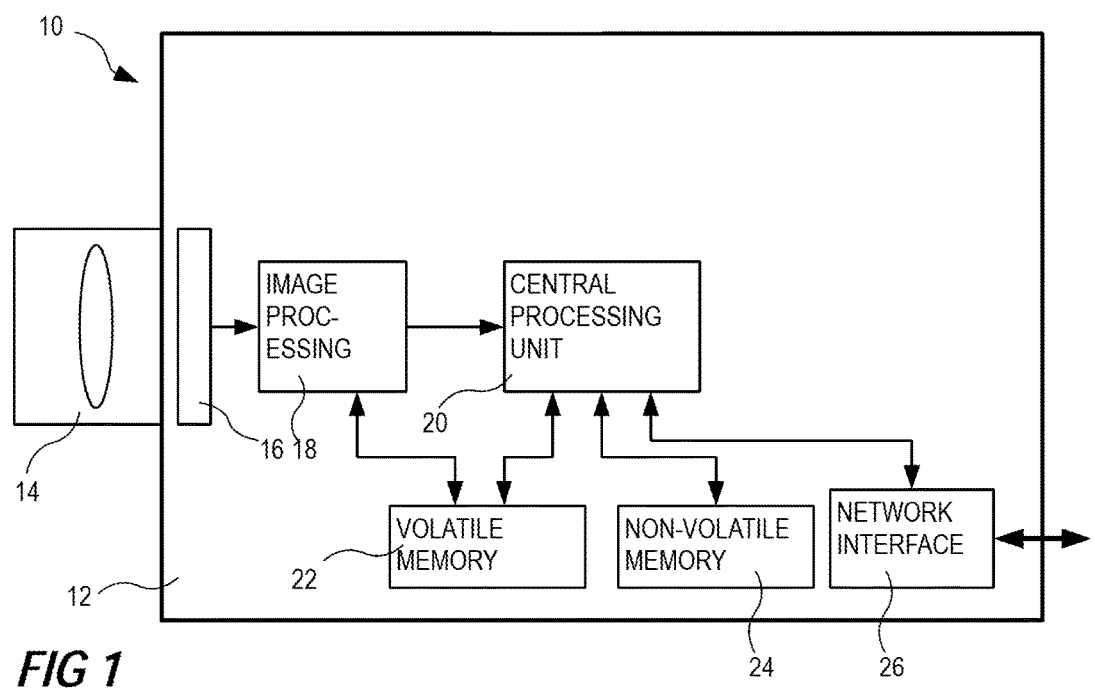
FIG. 1 is a schematic block view of a camera head.

FIG. 1 is a block diagram of a camera head as used in a several embodiments of the present invention. The camera 10 has a lens 14 (a set of lenses, an objective, etc.) projecting the light from an area to be imaged onto an image sensor 16. The information from the image sensor 16 is processed in an image processor 18 which may or may not form a part of central processing unit 20. The image processor 18 may in one or more embodiments communicate with a volatile memory 22, which may also communicate with the central processing unit 20. A non-volatile memory 24 may be arranged to communicate with the CPU 20 is a normal fashion. The video camera may also comprise a network interface 26 for communication within a network. The lens 14 is a zoom lens. The zoom lens is set manually and there may be no logging of current zoom settings.

Figure 2:
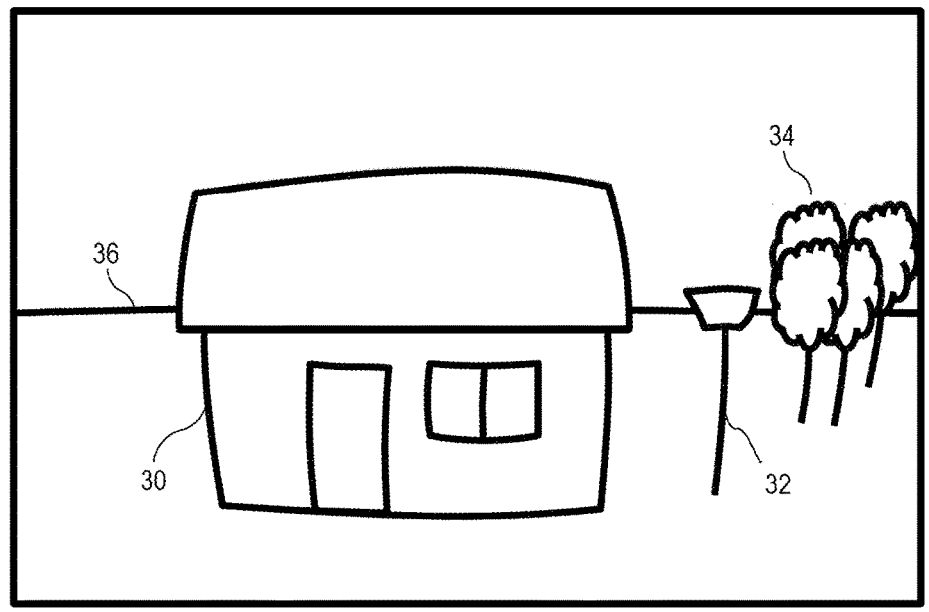
FIG. 2 is an image displaying barrel distortion.

FIG. 2 is a schematic imaged view of a scene including a building 30, a lamppost 32, a group of trees 34 and a horizon 36. The object as such is not essential, yet the effect of barrel distortion is exemplified by the curved lines that should have been straight. Each object may contain a number of lines that should have been straight. Note that the distortion in the imaged scene is not modelled, rather it is merely for explanatory purposes. Also, even though objects in the scene are mere examples it is quite typical that the straight lines have a higher representation in manmade objects (the house, elements of the house and the lamppost). In a typical monitoring application for a video camera, e.g. a surveillance application, a scene would include man-made objects, and by that a scene to be captured would include straight lines. For that reason the present disclosure may be particularly relevant for such a monitoring application.

Figure 3:
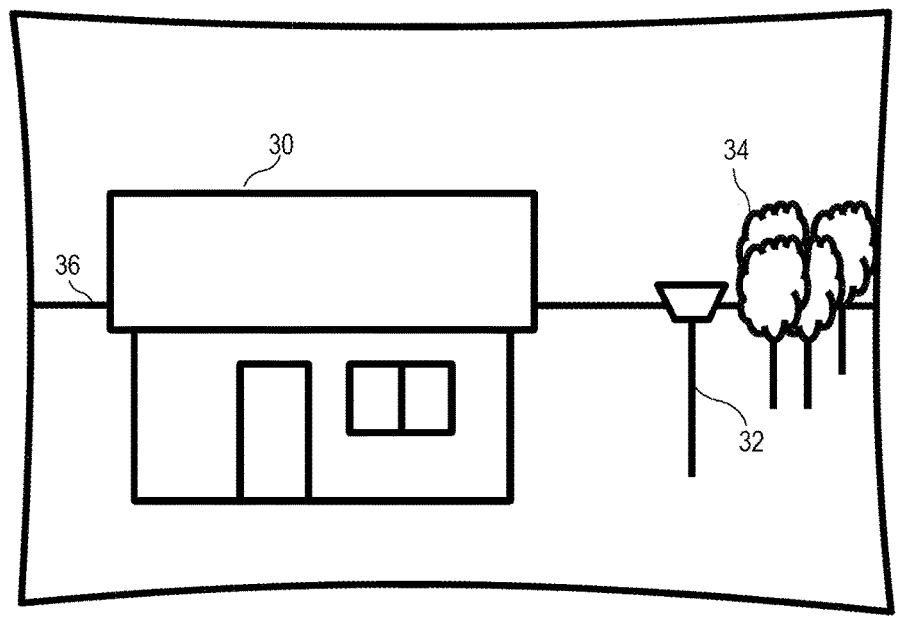
FIG. 3 is the image of FIG. 2 after a distortion-correction function has been applied.

In FIG. 3 a distortion-correction function has been applied. Again, the image is for explanatory purposes only. After application of the distortion-correction function lines that are supposed to be straight have been straightened, and the effect of a varying magnification in the distorted image is that the frame of the corrected image obtains a pincushion shape. Distortion correction functions may have different complexities, and depending on e.g. input data some or other distortions may prevail after distortion correction as well.

As for the correction function the general approach may be to use a polynomial of n:th degree. In the below equation $R_u$ denotes a corrected, undistorted radius being a function of the distorted radius $r_{bd}$. The constant $k_n$ is a constant that may be deduced in a process of fitting the function to a curve.

$$R_u(r_{bd})_f = k_0 + k_1 r_{bd} + k_2 r_{bd}^2 + k_3 r_{bd}^3 + k_4 r_{bd}^4 + k_5 r_{bd}^5 + \ldots \qquad [\text{eq. 1}]$$

In a simplified approach, which usually is considered acceptable, all constants but for $k_0$, $k_1$ and $k_3$ are set to zero, such that:

$$R_u(r_{bd})_f = k_0 + k_1 r_{bd} + k_3 r_{bd}^3 \qquad [\text{eq. 2}]$$

By setting the coordinate system appropriately $k_0$ may be set to zero as well. In other embodiments polynomials of other orders may be used, and in still other embodiments other function may be used instead.

Once an appropriate form for the polynomial is selected a database or a compilation of data may be built. This is exemplified by the first step in the flowchart of FIG. 4 and FIG. 5. The dotted line from the step of mapping correction polynomials to the subsequent step is meant to indicate that the mapping and generation of characteristics data is generally performed as a separate step, not near in time or even space with the subsequent step of acquiring an image. Such data may be provided by a camera manufacturer, a lens manufacturer, another service provider, a group of users etc. Some manufactures provide such data already today, e.g. for the purpose of allowing for users to perfect acquired pictures in a post-production process. The data as such may be important for the function of the method, but details of the creation of the compiled data may not be as important.

When compiling the data (performing the mapping) for a particular lens or lens combination a set of values for the constants $k_i$ of the polynomial will be associated with each zoom setting or focal length. The result is that for a finite number of discrete settings of zoom or focal length there will be a set of values for the constants $k_i$; $k_0$, $k_2$ and $k_3$ as for the simplified equation eq. 2. When possible such sets may be expressed as functions themselves such that their values for intermediate focal lengths may be interpolated as well.

In a practical situation the data may be compiled once for each lens, but it may also be compiled once for each type of lens or lens system. Any subsequent user of the data may then download the data, and/or the data may be included in a non-volatile memory of the camera system.

Figures 4, 5:
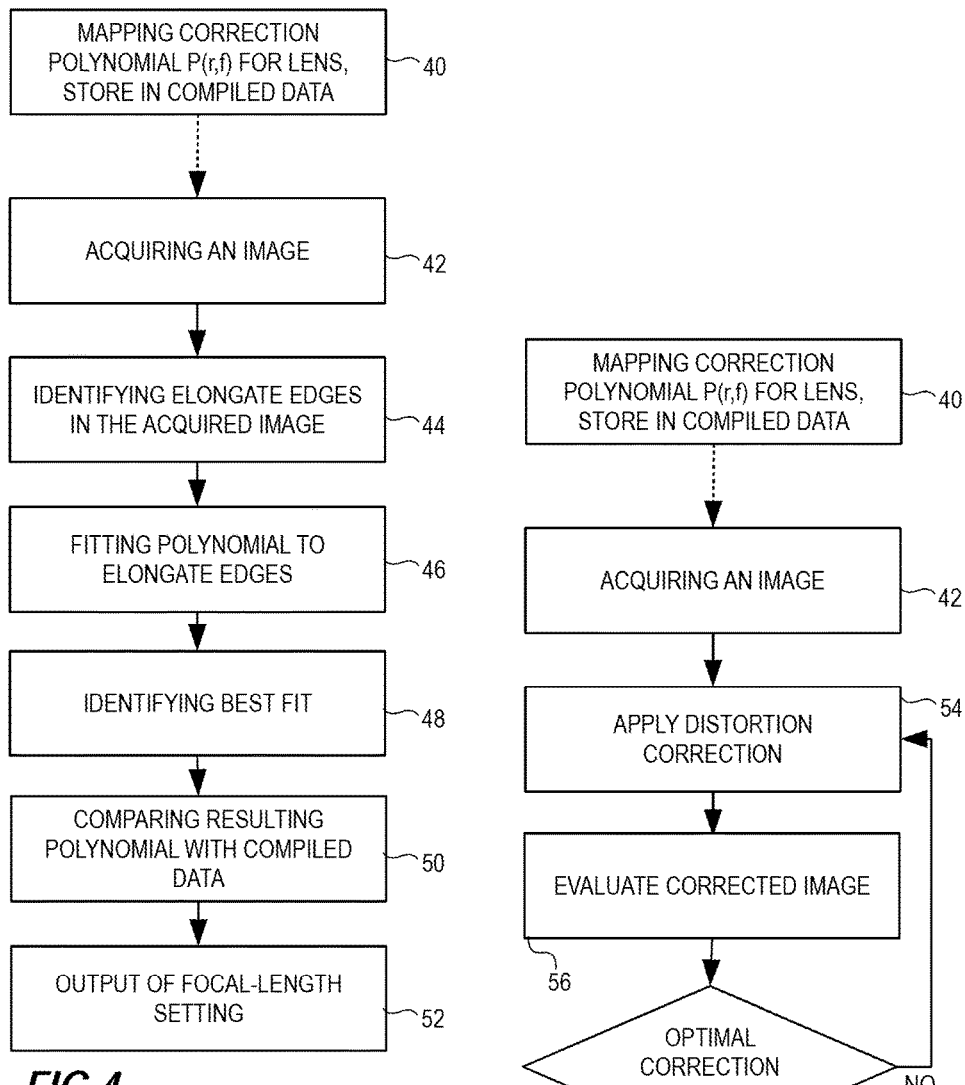
FIG. 4 is a flow chart of a first embodiment of the present invention.
FIG. 5 is a flow chart of a second embodiment of the present invention.

FIG. 4 is a flow chart illustrating a first embodiment. The first operation is to form the data 40, which has been discussed already. The combined data may in one or more embodiments take the form of a function, which in certain applications may be advantageous and effective. The distortion-correction functions do not have to be polynomials, though it is a common form.

In the next step 42 an image is acquired and analysis may be initiated, and in this first embodiment the analysis is initiated with identifying 44 elongate edges in the distorted image, since the elongate edges are probable candidates to be transformed to straight lines after application of the distortion-correction function. Edges may be found using any existing edge-detection algorithm.

After having identified and localized the edges, polynomials, or other functions for that matter, may be fitted 46 to the elongate edges. Fitting functions to a set of points located in an image may also be done in several different ways. A straight-forward fitting and evaluation using a least square method may be used, and a transform to parameter space and solution using a Hough transform may be used as well. Depending on the situation some fitting methods may be more suitable than others, and the selection of the which fitting method to use is a straightforward operation for the skilled person. When the polynomials are identified the results in terms of the resulting constants $k_i$ may be compared. Even if it may be superfluous to mention it, the form of the polynomials may preferably be the same as for the polynomials used when the data was compiled in order for the result of the fitting to be usable and to add a guiding constraint to the solution process.

After fitting of the polynomials to curved lines of the distorted image, and having identified a best fit in step 48, the values for the constants $k_i$ may be used to for comparison with the data in step 50. From the comparison the best fit may be selected and the data associated with that particular fit may be identified. One output derived from the method may be the current focal-length setting for the lens system (step 52). The focal length is a property that may be usable in several processes, the optimization of the aperture being mentioned in the background section. Some further examples include optimization of exposure settings, image stabilisation (minimization of the effect of vibration and shake), and the mere ability to present the focal-length setting to a user for the user to utilize in any other way, to mention a few.

The flow chart of FIG. 5 illustrates a second embodiment, in which more of a global view is applied. Again an image of a scene is acquired (step 42), the image displaying a distortion such as a barrel distortion. The selection criterion comprises an iterative process, which as such is similar to the selection criterion previously described, yet the distortion-correction functions stored in the compilation of data are used in a more direct fashion. The iterative process comprises applying a distortion-correction function (step 54) for a particular focal length on the distorted image. The corrected image, which has been corrected "blindly" may still be distorted, and is likely to be. The next action is therefore to evaluate the corrected image, in step 56. In one example a straight-edge detection is performed, and in other examples one of the already mentioned techniques may be used. It may be mentioned yet again that the polynomials or transformation functions used to describe the distortions for the particular lens and for various focus setting thereof may be, and often is, known. Using this input as further a constraint and effectively limiting the space available for solutions, may further accelerate an analysis.

If a straight-edge detection is used, a measure of the amount of straight edges in the corrected image is deduced, enabling for comparison between images. One assumption may be that the higher the amount of straight edges, the better the correction. In a subsequent step another distortion-correction function for another focal length is applied, and following the straight-line detection the new measure of the amount of straight lines in the corrected image deduced. The new value is compared to the previous value (or several previous values) and may be deduced if the correction was for the better or for the worse. The process is then iterated until an optimal fit is achieved (see step 58). There are several optimization algorithms that may be used, some of which have been mentioned already. In all and any embodiments mentioned the evaluation may be performed on portions of an image rather than the entire image. The order of events in the process may be modified in related embodiments, and instead of making comparisons as a step in the iterative process the comparison may be performed after all available distortion functions have been applied, after which the selection corresponds to finding an extreme value (maximum or minimum) in a set of data. The output will still be a value for the focal-length setting in step 52.

When only portions of the image are evaluated rather than the entire image these portions may be user selected or identified by means of image analysis. An example could be that if an object has been identified as an object having straight edges (such as a building) it could be selected as one of the portions to be used, while if an object is identified as an object not expected to have straight edges (such as a human) it could be removed from the portions to be evaluated. Furthermore, various portions of the image may be given different weights in the evaluation. One example could be that since the effects of distortion will increase with distance from the optical axis edges being further away from the optical axis may be given a greater weight.

Again, the output may be a value of the current focal-length settings for the particular lens or lens system.

In an alternative approach, which could be defined as a third embodiment, the global optimization is performed on the localized elongated edges only. Such an embodiment would imply that in first embodiment, when the elongate edges have been detected, the selection criterion of the second embodiment is applied. Therefore, in an iterative optimization process the best fitting polynomial is found and in each step of the iterative process the "amount" of straight lines is quantified. It may be said that other optimization processes or fitting processes may be used.

Any of the embodiments of the present disclosure may be applied to an imaging system having a zoom lens or lens system. The embodiments are particularly useful for calibrating or identifying the current focal length setting for zoom-lens system. At the same time the optimal distortion correction will be identified, at least within the constraints of the compiled data and the use thereof.

In a monitoring system a method according to the present disclosure may be useful, in particular if the lens system used is of a type including a zoom lens or a varifocal lens where the current settings are not tracked in any way. For such a monitoring system the method may be applied upon request by an operator or as a step in an initiation or calibration process. Even if possible, there is no apparent need or benefit for the method to run continuously. A focal-length setting and an optimal distortion correction have been identified, and a new identification is not necessary until a change has occurred.

Furthermore, though "zoom", "zoom settings", "focal length" and "focal length setting" etc. have been used throughout the present description the output from the method may equally well be another measure or parameter through which the named parameters may be deduced.

There are several approaches that may be used to deduce the most representative distortion-correction function, and the order of actions may differ from those presented in relation to the embodiments.

In this context a general comment applying to all embodiments may be that the compiled data does not have to contain the distortion-correction functions as such. It may instead contain information which in turn may be used to identify the distortion-correction function. One example could be that the data includes any constants used by the distortion-correction function, while the basic form of the distortion-correction function is stored elsewhere. From a practical standpoint this does not matter, though from the viewpoint of optimizing information logistics different concepts may be used in different situations. The present disclosure does not require any limitation in this respect in order to be applicable.

What is claimed is:

1. A method for determining a focal-length setting of a lens mounted to a camera, said method comprising:
   capturing an image of a scene through the lens, which is introducing distortion to the captured image,
   identifying edges in the image, by means of an edge-detection algorithm, identifying functions describing at least a fraction of the identified edges, comparing the identified functions or a selection and/or combination of the identified functions with data compilation for the lens, wherein the data compilation comprises transformation data correlating a distortion-correction function with a number of focal-length settings for the lens, identifying by use of the data compilation a focal-length setting which is related to the identified functions, or the selection and/or the combination of the identified functions, wherein the step of identifying functions is based on fitting of the distortion-correction functions available in the transformation data, comprising:

applying distortion-correction functions on the distorted image or portions thereof, evaluating the amount of straight lines in the image or portions thereof, identifying distortion-correction function resulting in the maximum amount of straight lines, identifying the focal-length setting corresponding to the identified distortion correction function.

2. The method of claim 1, wherein the step of identifying functions is performed on edges identified in the distorted image while in a distorted format.

3. The method of claim 1, wherein the step of identifying functions is performed on the identified edges or a subselection thereof only.

4. The method of claim 1, wherein the distortion-correction function is a polynomial of degree 5 or less.

5. The method of claim 4, wherein the distortion-correction function is a polynomial of degree 4 or less.

6. The method of claim 4, wherein the distortion-correction function is a polynomial of degree 3, 2, or 1.

7. The method of claim 1, wherein the step of identifying functions utilizes an iterative mathematical optimization technique.

8. The method of claim 1, wherein the data compilation comprises a mapping of polynomials correlated focal-length settings for the lens.

9. A camera for performing the method of claim 1, the camera comprising an image processor, wherein the processor is configured to identify edges in an acquired image by application of an edge-detection algorithms and to identify functions describing at least a fraction of the identified edges, the camera further comprising a storage area containing a data compilation relating to transformation data correlating a distortion-correction function with a number of focal-length settings for the lens, and being configured to identify, by use of the data compilation and the identified functions or a selection and/or combination of the identified function, a focal-length setting which is related to the identified functions, or the selection and/or the combination of the identified functions.

* * * * *